United States Patent [19]
Brot

[11] Patent Number: 5,246,217
[45] Date of Patent: Sep. 21, 1993

[54] CLAMPING ELEMENT AND SHACKLE

[75] Inventor: Waldemar Brot, Räterschen, Switzerland

[73] Assignee: Saurer-Allma GmbH, Kempten, Fed. Rep. of Germany

[21] Appl. No.: 824,853

[22] Filed: Jan. 24, 1992

[30] Foreign Application Priority Data

Jan. 29, 1991 [CH] Switzerland .............................. 266/91

[51] Int. Cl.⁵ .............................................. B23Q 3/00
[52] U.S. Cl. ..................................... 269/309; 269/91; 269/99; 269/88; 269/25; 269/900; 269/305; 269/47; 269/296
[58] Field of Search ............. 269/309, 310, 47, 91-94, 269/99-100, 296, 900, 305, 20, 25, 88

[56] References Cited

U.S. PATENT DOCUMENTS 2,401,054  11/1947  Daley .
3,606,300   9/1971  Davis ...................... 269/309
4,140,305   2/1979  Rabin ...................... 269/900

FOREIGN PATENT DOCUMENTS

0237490  9/1987  European Pat. Off. .
3733708  9/1988  Fed. Rep. of Germany .
9012822  11/1990 Fed. Rep. of Germany .
2136129  9/1984  United Kingdom .

Primary Examiner—Robert C. Watson
Attorney, Agent, or Firm—Martin A. Farber

[57] ABSTRACT

A clamping element (4) for the clamping of workpieces on a clamping surface (1b) with receiving recesses distributed over its surface in accordance with a predetermined division (Ra) has on its clamping body at least two attachment openings (9) spaced from each other by the division spacing (a) and at least two clamping holes (10) which are in each case distributed along at least one circle around a longitudinal axis (8) of the clamping element (4) in order to achieve high reproducibility with a great variety of possible uses.

43 Claims, 8 Drawing Sheets

CLAMPING ELEMENT AND SHACKLE

FIELD AND BACKGROUND OF THE INVENTION

The present invention relates to a clamping element and a shackle.

For the machining of workpieces, in particular with control by a predetermined program, the workpieces are fastened on clamping plates which have receiving recesses in a predetermined distribution or with given spacings on a clamping surface. These receiving recesses can be developed as T-grooves and perforated plates are also being increasingly used. Particularly for today's control technology it is important in this connection that the workpieces be aligned in a predetermined manner so that no change need be made in the program. For the clamping on the clamping surfaces, many different systems are available on the market which—corresponding to the precision required—are relatively expensive and comprise numerous clamping parts and elements each of which is developed and is suitable for a specific purpose. This leads to the acquisition and storage of a large number of such expensive parts and to corresponding capital expenditures which are then also reflected in the machined parts.

SUMMARY OF THE INVENTION

It is therefore the object of the present invention to provide simplification and a reduction in cost here by making it possible to use a single clamping element for the most different purposes.

This is achieved in a surprisingly simple manner by the clamping element of the present invention. An additional advantageous result is the relatively simple construction of such a clamping element, which can therefore also be manufactured relatively cheaply and in large quantities.

The invention also provides a shackle which has improved guidance upon a pulling down thereof.

BRIEF DESCRIPTION OF THE DRAWINGS

Further details of the invention will become evident from the following description with reference to the embodiments shown diagrammatically in the drawing, in which:

FIGS. 9 and 10 are additional embodiments of a clamping element of the invention according to FIG. 3, FIG. 9 illustrating its use as pendulum stop and positioning element while FIG. 10 illustrates its use as fixed stop or double tightener;

DETAILED DESCRIPTION OF THE PREFERRED EMBODIMENT

Figure 1A:
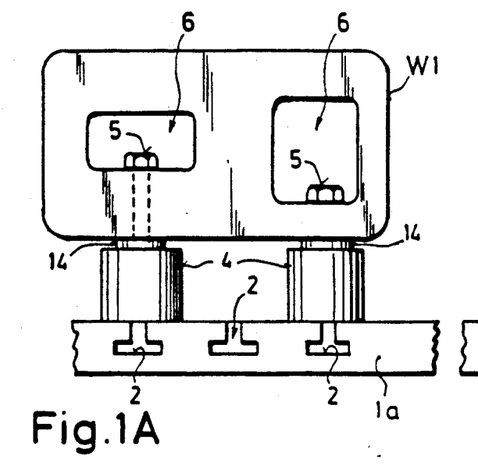
FIGS. 1A and 1B show a clamping element of the invention upon its use as hollow prism, i.e. for the clamping of workpieces having hollows on clamping surfaces having different receiving recesses, in which connection
Figure 1B:
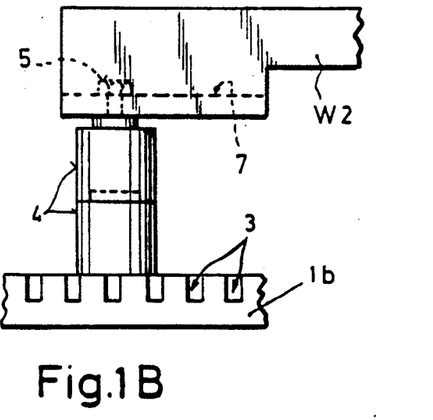

FIGS. 1A, 1B show two clamping plates 1a, 1b, the clamping plate 1a being provided with T-grooves 2 and the clamping plate 1b with a grid of receiving holes 3 with in each case predetermined spacings. The clamping elements 4 of the invention can be fastened in said receiving recesses 2, 3 in a manner which will be described further below. As will be explained below with reference to FIGS. 2A, 2B, said elements 4 are provided with clamping holes which are arranged with a very specific geometry and which are provided with an internal thread for the screwing therein of a clamping bolt 5. In this way workpieces W1 having hollows 6 or protruding flanges 7 can be clamped fast. The position of the workpieces W1, W2 is secured in reproducible manner by the precise positioning of the clamping elements 4 on the clamping surfaces 1a, 1b, or possibly by clamping bolts 5 in the workpieces, which pass through an opening so that just-in-time production, i.e. the production of small quantities at different times when they are just needed, is facilitated and assured. Mention may be made here of the fact that for the function of a hollow prism shown in FIGS. 1A, 1B, special clamping elements have been used up to now and it will be shown below what additional functions which up to now were performed by special clamping elements, can be performed by a clamping element according to the invention.

It is essential for the invention that—contrary to up to now when the arrangement of the attachment openings and clamping holes corresponded essentially to the spacing grid—these openings and holes are arranged along at least one circle around an axis. This can be clearly noted from FIGS. 2A and 2B. According to FIG. 2A, three approximately cylindrically shaped clamping elements 4a to 4c are fastened in parallel rows in different positions on a clamping plate 1a having T-grooves. The cylindrical development of the clamping elements 4 is, in principle, preferred, not least of all because it is also simple to manufacture, but it is not absolutely required and could be replace by other shapes, such as a prismatic shape or one of those shown further below.

As can be noted, each clamping element has two circles of bore holes, the circles extending concentrically to each other around a longitudinal axis 8 and having different radii; the outer circle has attachment holes 9 which are provided with recesses for cylinder head screws or the like and between which there are clamping holes 10. The bolts 5 shown in FIGS. 1A, 1B are screwed in each case into one such clamping hole.

The specific position of the clamping element 4 on the clamping surface 1a or 1b is determined by the position of the attachment holes 9 via which the element 4 is fastened to the surface 1a or 1b. Those attachment openings on which the attachment takes place are shown in dark (crosswise) hatching in FIG. 1A and it can be noted that by the selection of different attachment openings 9 a wide range of adjustment SA can be obtained. In this case the attachment openings are preferably formed by holes although it would also be conceivable to develop them as grooves extending from the outer surface of the elements. However, this might impair the required precision. The position of a clamping screw 5 relative to the axis 8 depends with respect to its angle on the one hand on the clamping holes 10 selected, but also on the attachment opening 9 selected, as can be noted from a comparison of the positions of the holes of the elements 4a to 4c. It would therefore be conceivable to replace one or the other of the attachment openings 9 by clamping holes 10, and vice versa. It is, in principle, also not absolutely necessary to arrange the holes and openings at equal angular distances apart as in the case in FIGS. 2A, 2B, but with this arrangement there result the advantages discussed with reference to FIG. 2B.

In principle, a single circle of openings 9 and holes 10 could be sufficient for many applications. Here only clamping holes 10' are arranged in the inner circle shown. In addition, a positioning hole 11 is provided on the axis 8 into which hole, in the case of the element 4c, a positioning pin 12, which extends into the T-groove 2, is inserted in order to preposition the element prior to the screwing tight thereof by means of attachment screws 13. The positioning hole 11 is also developed as bore hole although other shapes (for instance polygonal) are also possible.

As can be noted particularly clearly from FIG. 1A, the upper end surface of the cylindrical clamping element 4 is developed substantially as a flat surface, which satisfies the requirement for a well-defined position of the workpiece. The end surface is however advisedly stepped in the manner shown. The inner part bearing the inner circle of clamping holes 10' forming an elevation 14. The purpose of this measure will be explained further below.

Figure 2A:
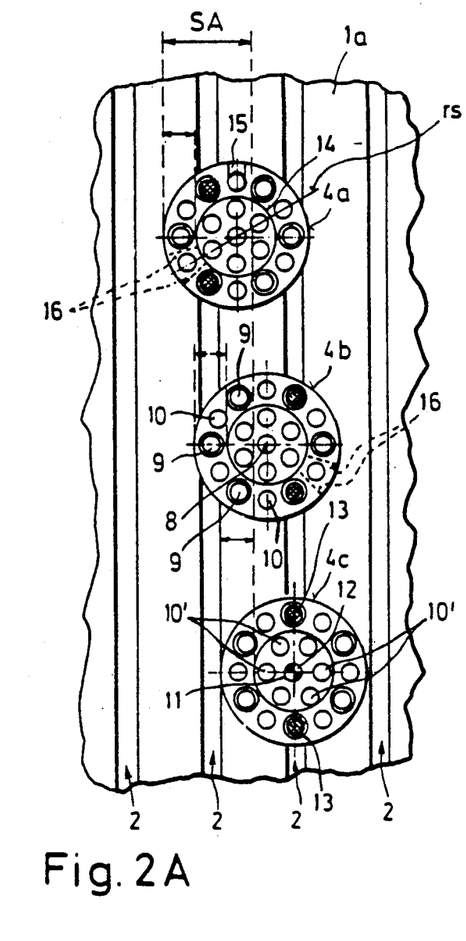
FIG. 2A and 2B are top views explaining the development of the invention and its advantages.

As can also be noted from FIG. 2A, it is desirable, in accordance with a preferred embodiment, if the clamping holes 10' of the inner circle lie in each case on the same radial line rs as the corresponding clamping hole 10 of the outer circle. It has however already been mentioned that the attachment openings 9 can possible exchanged with the clamping holes 10, in which case an inner clamping hole 10' and an outer attachment opening 9 would lie on the corresponding radial line rs, which however is not preferred. The ratio of the radii of the two circles, measured in each case from the axis 8 to the center points of the clamping holes 10 and 10' respectively, could in principle be different, but advantageous geometric conditions result in certain applications if the radius ratio is 1:2.

Figure 2B:
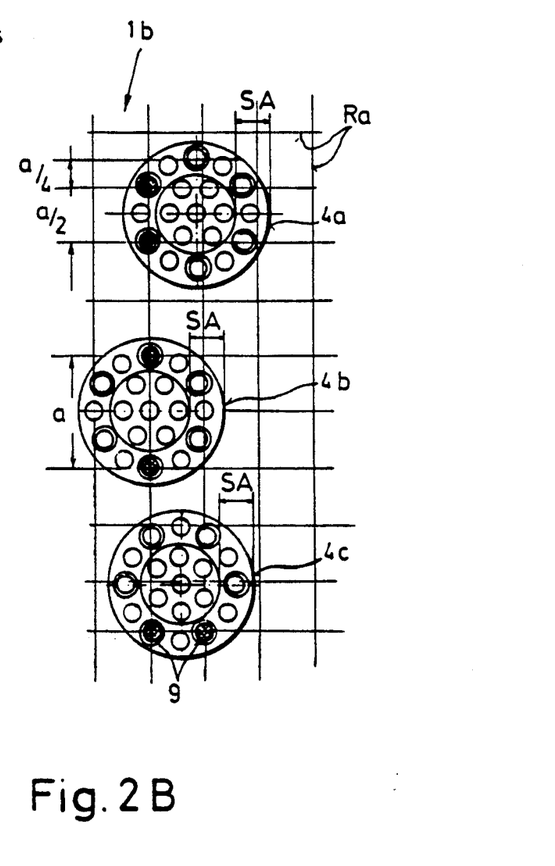

FIG. 2B shows the aperture plate 1B or an equivalent clamping surface traversed by T-grooves extending crosswise along the grid Ra shown. If twice the grid pitch now amounts to a then, with the openings and holes arranged on a hexagon as shown, not only can a corresponding region displacement advantageously result merely by the proper selection of the attachment openings 9, but the hole spacings correspond in each case to the dimensions a/2 and a/4, in which connection the latter subdivision, which is of advantage for certain applications, could not be achieved at all, or at least not in such reproducible manner, with the clamping elements available on the market.

The desired reproducibility is established in particular by the discreet subdivision by means of the holes 10 and the openings 9. For a given workpiece, only the attachment opening and the clamping hole selected need be marked in order to be able, later on, to clamp a workpiece fast in precisely the same manner. Therefore, in order to facilitate this marking fields 15 (see FIG. 2A) can be associated with the individual openings or holes as the one shown with reference to element 4a, in order to number the corresponding opening or hole or mark it by a letter. Of course, such marking fields could also be arranged on the outer surface of the element 4 or on its elevation 14 instead of on the end surface.

Limiting surfaces 16 are indicated in dashed line on the clamping elements 4a to 4c of FIGS. 2A and 2B, which surfaces in themselves do not belong at all to the embodiment of a clamping element 4 shown in FIGS. 1A and 1B, but to the embodiment shown in FIG. 3, which will be described further below. It may however first of all be pointed out that, in the case of FIG. 1B, the purpose and advantage of the elevation 14 become clear if one proceeds therefrom that a depression which corresponds thereto is provided on the lower end set of the corresponding clamping element 4 since in that case a reliable centering is obtained upon the stacking of two or more such clamping elements 4 on top of each other, which permits the construction of clamping elements of any height from such individual elements 4, which was not possible up to now.

Figure 3:
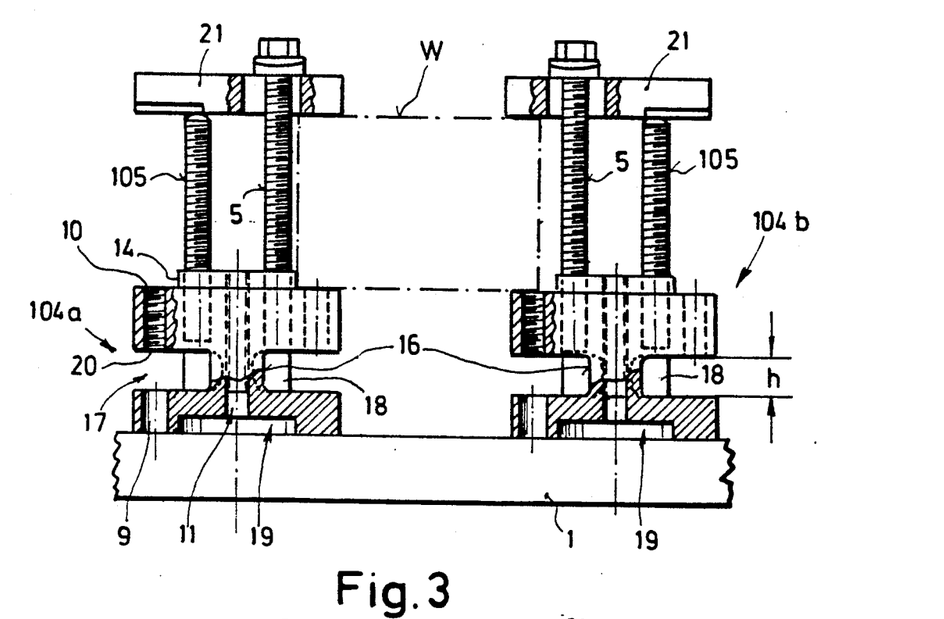
FIG. 3 shows another embodiment of the invention in cross section upon use as stop or positioning element for a workpiece.

In the case of FIG. 3, two clamping elements 104a, 104b are provided on a clamping surface I, the attachment screws not being shown for the sake of simplicity, especially since the attachment of clamping elements is known to the person skilled in the art. As already mentioned, the elements 104 differ from the elements 4 of FIGS. 1A, 1B by the fact that, out of the solid cylinder, an annular groove 17 is cut around a central cylinder 18, with the exception of a sector, indicated in dashed lines in FIGS. 2A and 2B, having the limiting surfaces 16. It is advantageous if the height h corresponds to the spacing grid (see FIG. 2B) or a fraction in the form of a unit fraction thereof, i.e. $\frac{1}{2}$ or $\frac{1}{4}$. The height h preferably amounts to $\frac{1}{4}$ of the spacing grid, i.e. if a=8 cm then h=2 cm, but in each case plus a predetermined tolerance.

FIG. 3 also shows the lower recess 19 which corresponds to the elevation 14 and receives it upon the stacking of several clamping elements, in the manner shown in FIG. 1B. Due to a section taken in different planes, both an attachment opening 9 and a clamping hole 10 can be noted. The latter is preferably provided with an internal thread 20 so as to be able to screw in the clamping bolts 5, 105 as is done in the case of traditional clamping elements and their corresponding clamping screws, in particular, in order to be able to also use ball pressure screws. However it would also be possible to provide unthreaded holes and to hold corresponding clamping rods by nuts and lock-nuts fast on the clamping element, for which the groove 17 affords a possibility. In the same way, the attachment opening 9 can be developed with or without thread.

FIG. 3 shows two cases of use with reference to the two clamping elements 104a, 104b. In the case of the element 104a, the elevation 14 is used as stop for the workpiece W, which thus rests on the one side against the outer end surface of the element 104a at the proper height and against the outer surface of the elevation 14 in proper lateral alignment. This corresponds to the stop elements available up to now on the market. However, in the case of the clamping element 104b no use is made of the stop function and the upper end surface of this element merely serves to support the workpiece at the proper height, i.e. it takes over the function of the positioning elements previously used for this. Since a workpiece W generally does not correspond to the spacing grid, this combination of stop element for defining the lateral alignment and positioning element for securing the vertical position is encountered quite frequently in practice, but in accordance with the invention it can be effected with a single type of clamping element.

Figure 4:
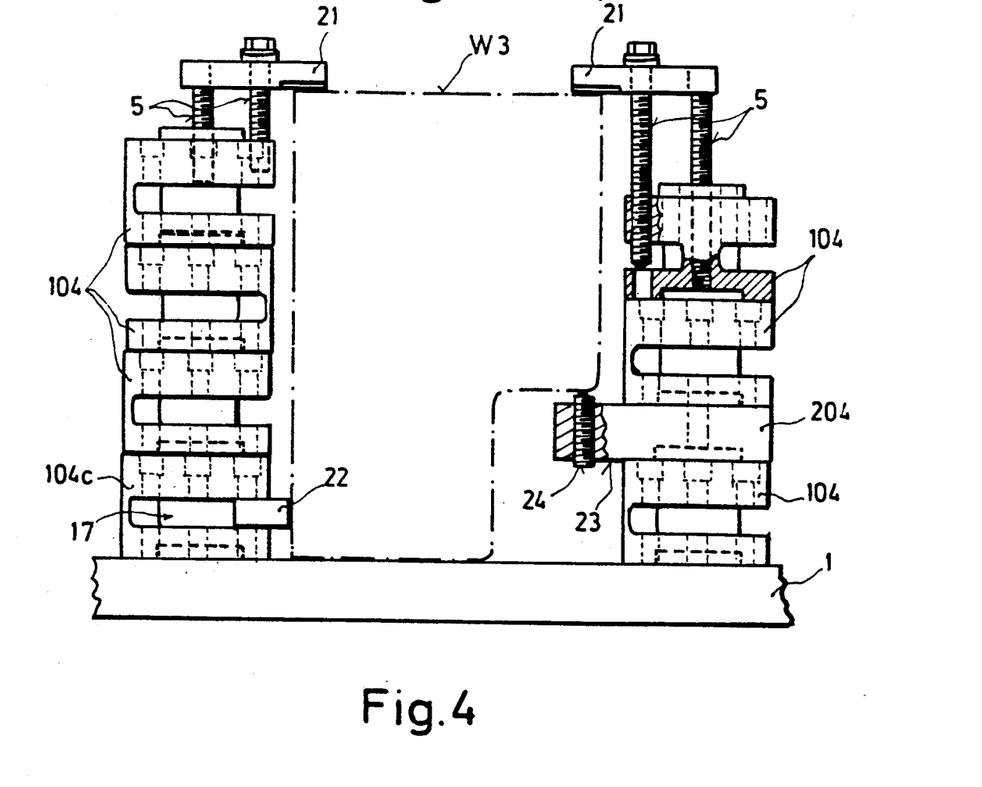
FIG. 4 shows special applications of this embodiment according to FIG. 3 for a vertical clamping block or an adjustable stop and support, this last application being illustrated with the use of another embodiment of the invention which is shown in FIG. 5 in top view upon use as horizontal tightener, in which connection FIG. 6 gives the corresponding side view, shown partially in section.

FIG. 4 shows the use for a more complicated workpiece W3. First of all several clamping elements 104, 104c are again stacked to form a tower, similar to what was shown with reference to FIG. 1B. In this way, there is achieved the function of a previously separate clamping element, which was traditionally known as a vertical clamping block. For this purpose, corresponding clamping screws 5 need merely be screwed into the uppermost clamping element and a shackle 21 (similar to the shackles 21 of FIG. 3) be attached in order to hold the workpiece W3 vertically upright. On the bottom the workpiece W3 is then seated on the clamping surface 1 and is secured in its height.

Since the workpiece W3 is relatively large, even slight angular displacement could result in a poor position and thus in faulty machining. Therefore a stopper 22 which can be adapted to the position of the workpiece W3 can be clamped fast in the annular groove 17 of the lowermost clamping element 104c by means of clamping screws (not shown) inside the element 104c, and the element 104c is thus developed as adjustable stop element which securely holds the workpiece W3 in its position.

The groove 17 could also be used for the purpose which will now be explained with reference to another embodiment of the invention. On the right side of FIG. 4 an element 204 is namely inserted above the lowermost element 104 into the tower. This element has—protruding above the circle for the bore holes (see FIG. 5) a bracket extension 23 through which pass advantageously a number of clamping holes 10″. A ball pressure screw 24 is inserted into such a clamping hole in FIG. 4 in order to support the workpiece W3 in a recess thereof, the ball which is inserted at the end of the screw 24 and is flat on top seeing to the compensating for any unevenesses. It is self-evident that the function exerted by the clamping element 204 could also be exercised by the clamping element 104 if, namely, a part corresponding to the bracket extension 23—similar to the stop piece 22—were inserted into the groove 17. In such a case, this inserted bracket extension would however not merely be clamped in the manner of an adjustable stop 22 but it would have advisedly corresponding bore holes for the attachment which are aligned with the clamping holes of the element 104 in order in this way to assure a well-defined position of the bracket extension thus inserted. Since on the other hand the position of a support screw 24 need not necessarily be defined, such attachment holes in the bracket extension are to be sure advantageous but they are not absolutely necessary.

Figure 5:
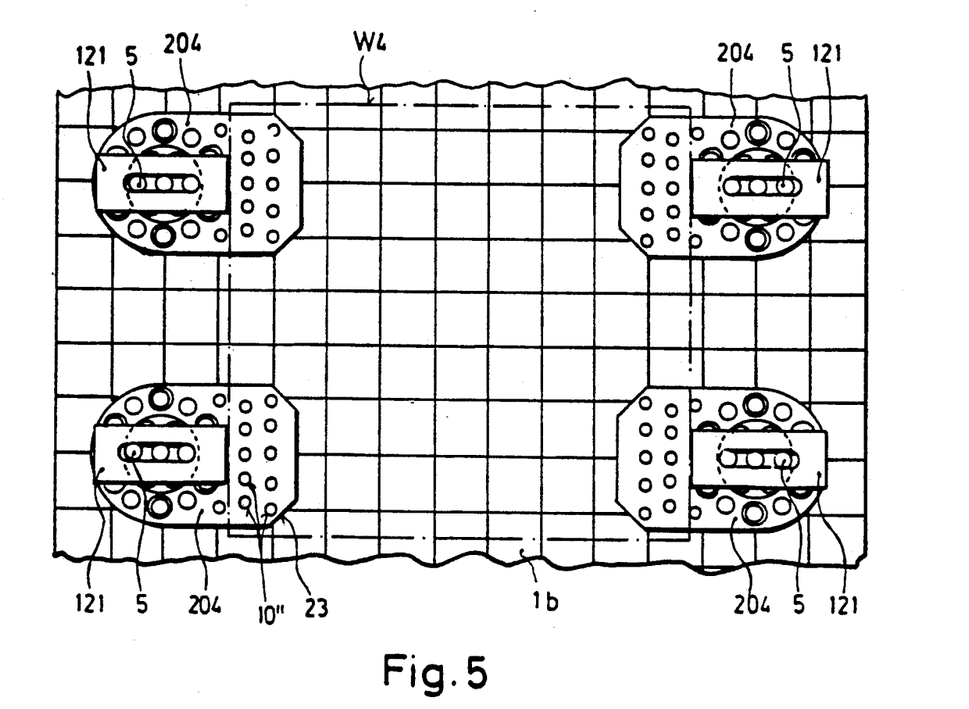

FIG. 5 shows four such clamping elements 204 for the horizontal clamping of a workpiece W4 by means of shackles 121. The shackles 121 must in this connection perform a clamping function upon the pulling down by means of a clamping screw 5 which presses them against the clamping element 204, i.e. they must subject the workpiece increasingly to lateral pressure upon the screwing down. For this purpose they are placed on the element by their end facing away from the workpiece W4 and are held obliquely in the direction towards the workpiece W4, whereupon they exert more and more lateral pressure on the workpiece W4 upon the screwing in of the screw 5.

Figure 6:
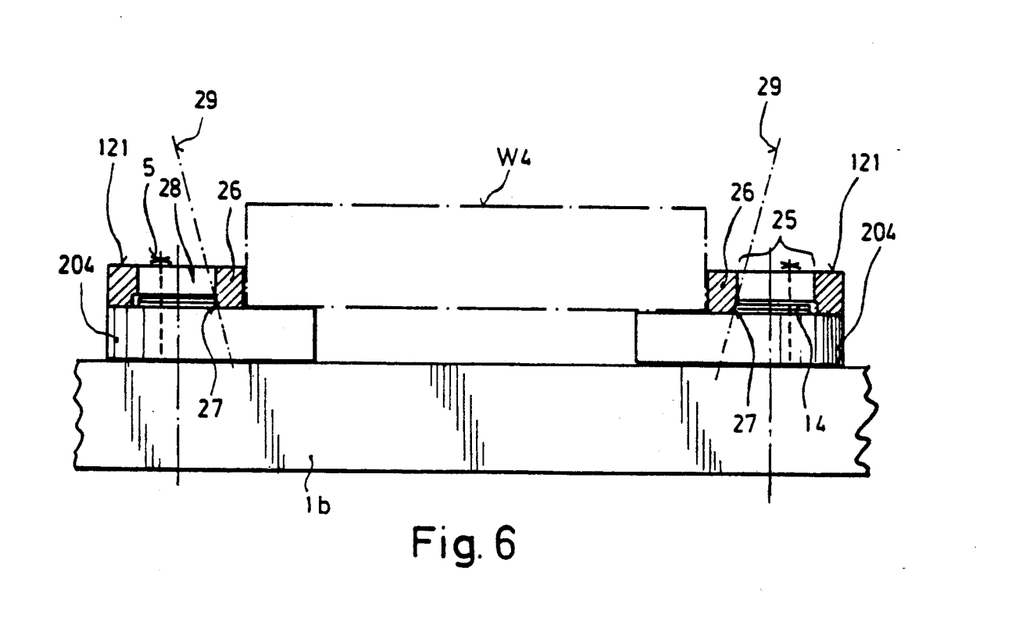

The shackles 121 have, as customary, a relatively flat body section 25 which comes to lie above the elevation 14 as can be noted in particular from FIG. 6. On the side facing the workpiece W4 they have a cross sectional thickening 26 which, via a step surface 27 provided on the bottom, passes into the flat central section 25. In the central section 25 there is an attachment opening 28 which is developed as a slot.

Figure 7:
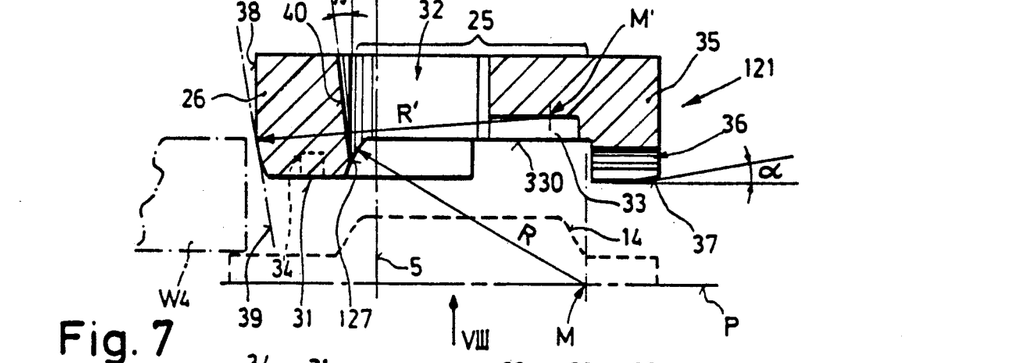
FIG. 7 shows the shackle of the invention, in section along line VII—VII of FIG. 8.
Figure 8:
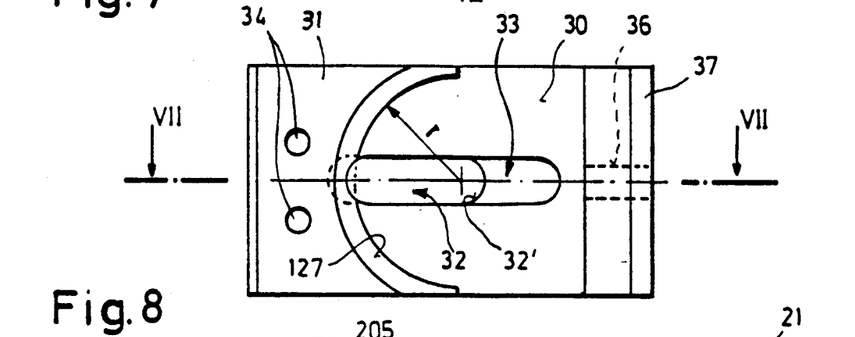
FIG. 8 is a bottom view of the shackle of FIG. 7, seen in the direction of the arrow VIII in said last-mentioned figure.

While the step surface 27—and generally also a mating surface on the clamping element—traditionally extends obliquely in the manner shown in FIG. 6, namely an inclination line 29, an improved embodiment can be noted from FIGS. 7 and 8. It may, however, be mentioned that it is within the scope of the invention to develop the elevation 14 as a conical frustum instead of cylindrical as in the case of the embodiments described up to now, as can be noted from FIG. 6, in order in this way to be better able to perform the pull-down clamping function and effect surface guidance of the shackle 121, although such a shackle with an inclination 29 could also slide over the edge of a cylindrical elevation 14.

It has now been found that the lateral clamping function upon the pulling down can be more favorably fulfilled if the inclination 29 is not uniform as in the known manner but extends along a curve and in particular along a circle. This embodiment will now be explained with reference to a shackle of the invention according to FIGS. 7 and 8. There is shown therein a shackle 221 having a flat central part 25 and thickened front part 26, the central part 25 being limited at its bottom by a limiting surface 30 and the thickened front part by a bottom surface 31. Both surfaces 30, 31 are flat and parallel to each other and connected via a step surface 127 which is inclined. As shown in particular, in FIG. 8, the step surface 127 extends in a semicircle have the radius r, which has its center point in the center of a rounding 32, of an attachment slot 32. Adjoining this slot 32 there is a groove 33. In the surface 31 there are two holes 34. Furthermore, the shackle 121 has a rear shoulder 35 of the same thickness as the thickening 26 and with a transverse bore 36 extending through the lower end.

The inclination of the step surface 127 is now not uniform but follows a curvature having the radius R, the center point thereof lying on a plane below and parallel to the surfaces 30 and 31 (the expression "below" being based on the normal position of such a shackle upon use). This parallel plane is designated P in FIG. 7. As shown by the dash-dot line, which extends upward from the center point of the radius R, said center point lies within the region of the inner surface of the shoulder 35.

Therefore, if the shoulder 35 of this shackle is placed on the clamping element 204 (see FIG. 6) and held with its thickening 26 obliquely upward, it is advisedly on an oblique shoulder surface 37 which is inclined to the plane of the surface 31 by an angle $\alpha$. If a clamping screw, which is merely indicated in dash-dot line, is then passed through the opening 32 and the shackle 121 screwed down, then the step surface 127 slides downward on the edge of the elevation 14 (indicated in dashed line). If the elevation 14 now has a similarly curved inclination, as is indicated in FIG. 7, then the shackle 121 is imparted guidance upon its downward movement, which displaces it forward towards the workpiece W4. In this connection, the inclination of the shackle with respect to the horizontal position shown decreases more and more, its nose surface 38 sliding along the side surface of the workpiece W4. It is therefore advantageous if said nose surface 38 also has a bevel corresponding to a line 39 which preferably merely represents a tangent to a curve (i.e. the middle tangent) which curve has advisedly the same radius as the step surface 127, namely radius R.

Since, due to the initial oblique position of the shackle corresponding to the inclination of the angle $\alpha$ on the surface 37 space must be provided for the screw 5 within the opening 32, its front surface 40 is advisedly bevelled, namely by an angle $\beta$, which should be at least as large as the angle $\alpha$ and preferably of the same amount.

It is self-evident that the curvature of the step surface 127 is independent of whether a corresponding curvature is also present on the elevation 14, but the guidance is improved thereby, especially since the above described tilting movement of the shackle corresponds to a swinging around the shoulder surface 37, for which reason the center point M of the radius R should lie as close as possible to the shoulder 35. The center point of the front radius R' is accordingly shifted forward (see point M'). Since the inclination created by the radius R' extends opposite to that of the step surface 127 (the latter is furthermore concave, while the nose surface 38 is convex), the center point M' lies also on a plane parallel to the plane of the surface 31 but shifted upward with respect to the latter.

Figure 9:
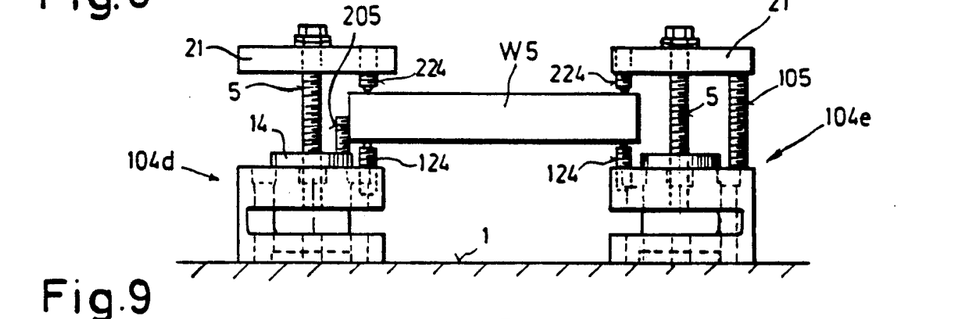

FIG. 9 shows the use of the clamping element according to FIG. 3 or of a pair thereof as pendulum stop element 104d and as pendulum positioning element 104e. In both cases, ball pressure screws 124, 224 are used in order securely to hold a workpiece W5 and to compensate for any unevenness by corresponding inclination of the ball of said screws. In such a case, the outer surface of the elevation 14 of the stop element 104d can only be used with difficulty, if at all, as a stop, but a clamping screw 205 inserted into a clamping hole 10' (see FIG. 2A) of the inner circle of holes may be useful for this purpose. On the positioning element 104e on the other hand, the workpiece W5 is merely held at the proper height without resting against a stop surface, in which connection the corresponding shackle 21 can be attached by two clamping screws 5, 105.

Figure 10:
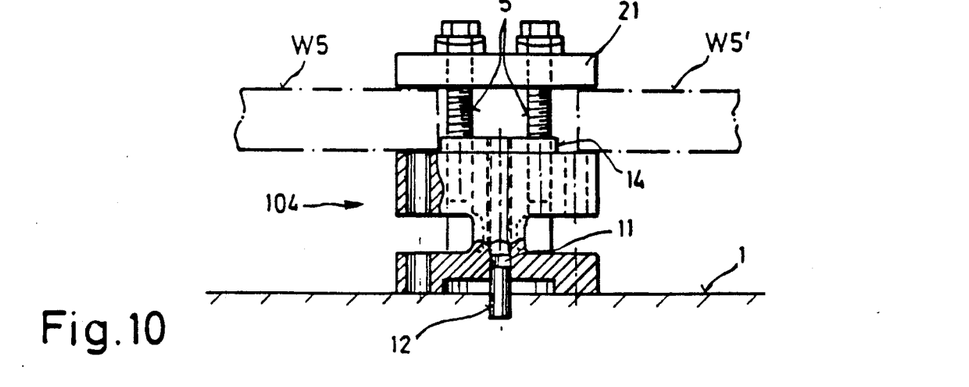

The clamping element 104 can also be used as double fastener with or without stop function, as shown in FIG. 10, in which connection this function could, for instance, also be satisfied by an embodiment according to FIG. 1. Here, two workpieces W5, W5' of the same thickness are simultaneously held by a common shackle 21, through the slot of which two clamping screws 5 are inserted and screwed into corresponding clamping holes 10 of the inner circle. As can be noted, the workpiece W5 rests against the outer surface of the elevation 14 which serves as stop. This figure furthermore shows that a positioning pin 12 is inserted within the central opening 11 for the prepositioning into the clamping surface 1 before the clamping element 104 is fixed in final manner on said surface 1. The central opening 11 can, as shown, possibly be provided with an internal thread so as to be able to use this opening also as clamping hole.

Figure 11:
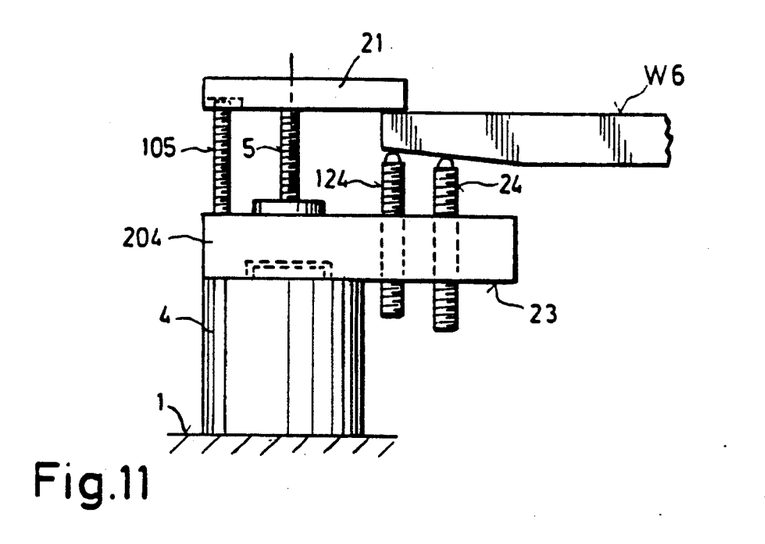
FIG. 11 shows the use of the clamping elements of the invention according to FIGS. 1 and 5 as basic elements of a vertical tightener or as support set.

In accordance with FIG. 11, the elements 4 and 204 are combined with each other in order to serve as support set or vertical tightener element. It may again be pointed out here that this function could also be achieved with a clamping element 104 having a groove 17 into which a corresponding bracket extension is inserted. In the present case, two ball pressure screws 24 and 124 are inserted into the bracket extension 23 at different levels so as to adopt themselves to a lower oblique surface of a workpiece W6. This workpiece W6 is held for machining at a predetermined level which is determined by the height of the shackle 21 and thus the length of the clamping screws 5, 105.

Figure 12:
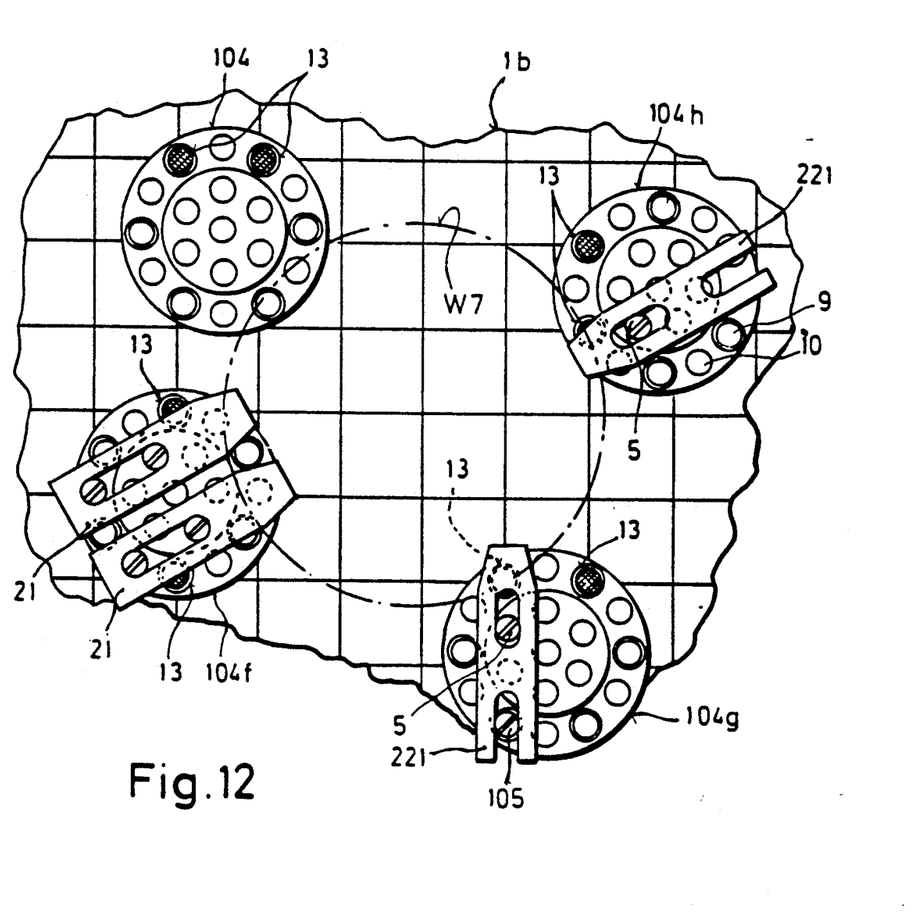
FIG. 12 shows the clamping of round parts on a clamping plate and the use of two shackles on a clamping element so as to obtain increased clamping force.

The clamping of a round workpiece W7 on a clamping surface 1b by means of four clamping elements 104 will be explained with reference to FIG. 12. The workpiece W7 lies in this case on the outer end surfaces of the clamping elements 104 at a well-defined height and is held by shackles 21 and 221 respectively, which are shown here merely as an example of the development of the shackles. It can be noted that the arrangement of the openings and holes 9 and 10 respectively on two (or more) circles or at the corner points of a hexagon affords the possibility of selecting in each case the optimal attachment of the shackles 21, 221 so as to apply the tightening force required. If it is necessary to make available an increased tightening force for the machining, it is conceivable to apply two shackles 21 on a clamping element 104f, which doubles the tightening force correspondingly. On the other hand, this example once again illustrates the large scale of variations possible for the attachment of the clamping elements 104 on the clamping surface 1b (the attachment screws 13 are in each case shown without their head). While the shackle 221 of the clamping element 104g is attached by two clamping screws 5, 105 only a single clamping screw 5 is provided for the shackle 221 of the element 104h, i.e. the tightening force can be adapted to the requirements also in this way.

Figure 13:
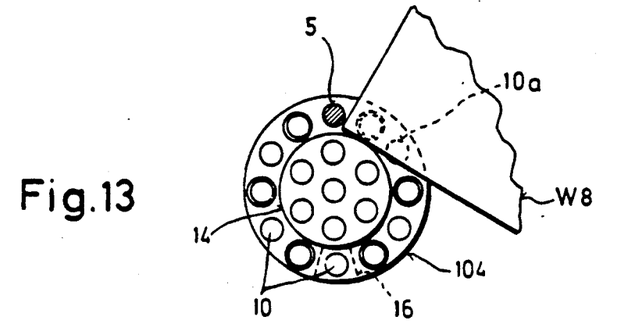
FIG. 13 shows the use of a clamping element of the invention as universal stop element for alignment in three axial directions in space.

It has already been pointed out that clamping elements in accordance with the invention are particularly suitable also as rigid stop elements. FIG. 13 illustrates that in this way an orientation in three axes in space can be obtained. A workpiece W8 rests in this case with one edge against the other surface of the elevation 14, which thus serves as stop in one direction in space. With its other edge, the workpiece W8 rests against a clamping screw 5 screwed into a clamping hole 10 of the outer circle, said clamping screw forming a stop in a second direction which is perpendicular to the first. Finally, an orientation of the workpiece W8 with respect to height can be achieved by insertion of a tightening or ball pressure screw into the clamping hole 10a lying below the workpiece W8.

Figure 14:
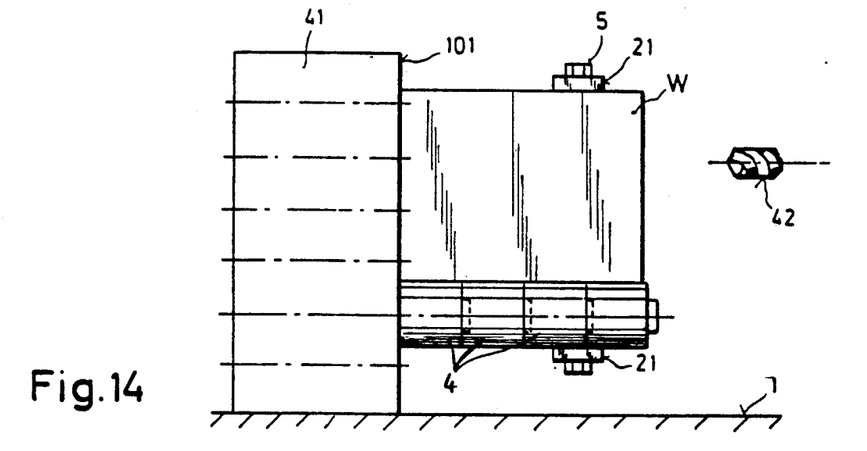
FIG. 14 shows the use of several clamping elements of the invention as workpiece support.

Occasionally, clamping cubes 41 in various shapes are available on the market as accessories to clamping plates 1 (FIG. 14) in order to form a vertical clamping surface 101. In this case a number of clamping elements 4 (or 104) of the invention can be clamped together in the manner already described in order to form a double angle as support for a workpiece W, which can be attached thereto for instance by shackles 21 and a clamping screw 5, so as to be machined on one surface by a machining tool 42. The dash-dot lines on the clamping cube 41 are intended to indicate the division of the receiving recesses provided thereon.

Figure 15:
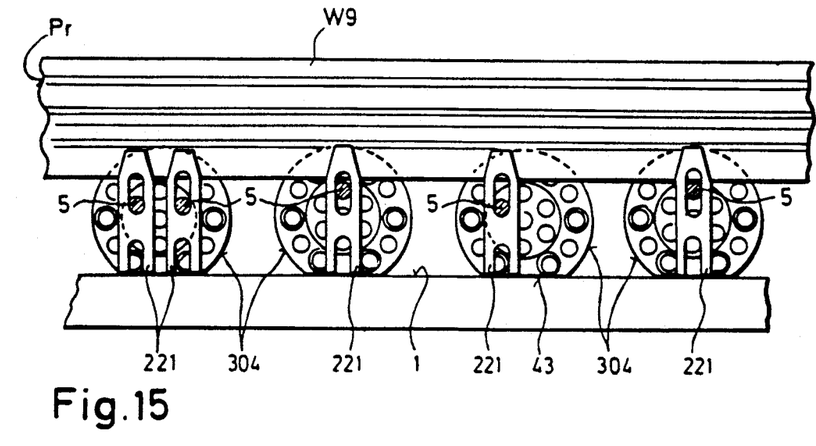
FIG. 15 shows clamping by means of several clamping elements of the invention for profile milling.

Further possibilities of use are shown in FIG. 15 in the case of another embodiment according to the invention. In this case, a profile ledge W is to be milled into the profile Pr shown on the left. Traditionally, several (expensive) vises are used for this purpose, they being replaced, according to FIG. 15, by an equal number of clamping elements 3 or 4, which are much cheaper to make. The clamping elements 3 or 4 differ from the clamping elements 4 o 104 merely by the fact that they have a flattened outer surface 43 with which they can be clamped onto a clamping surface How this clamping is effected will be described below with reference to FIG. 16. As has already been shown and explained with reference to FIG. 12, the shackles 221 required for this can be applied as desired and required, as shown in FIG. 15. The corresponding clamping screw 5 for the attachment of said shackles 221 is indicated here merely as a section by its shank.

Figure 16:
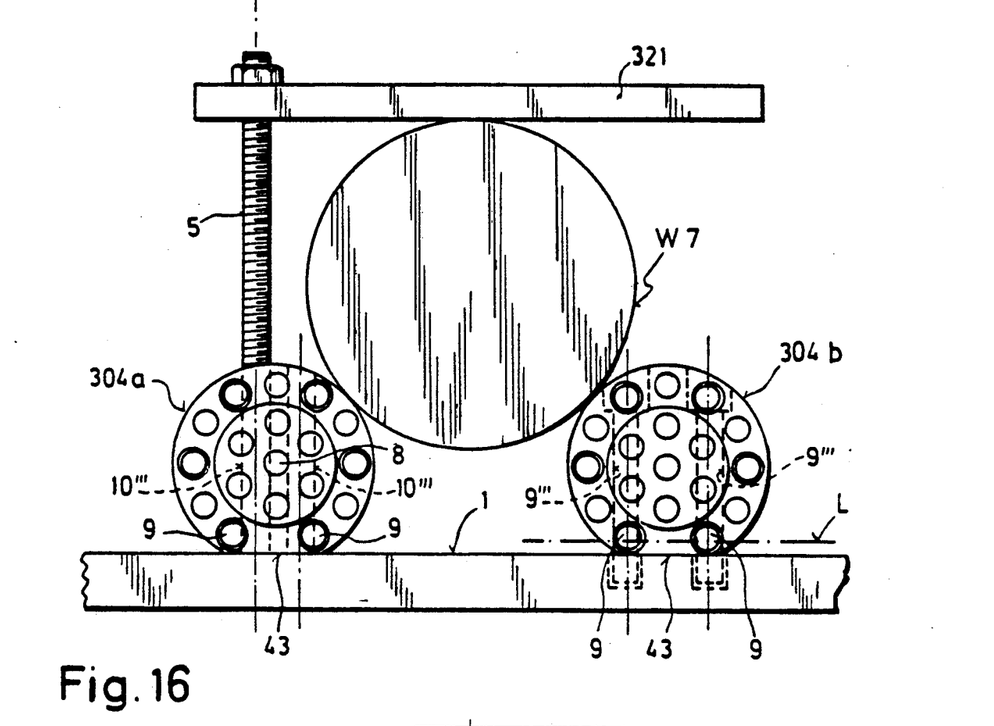
FIG. 16 shows the uses of prism clamping mount in another embodiment of the invention.

Two such clamping elements 304a, 304b serve, in accordance with FIG. 16, as clamping prisms for the round workpiece W7 on the clamping surface 1. Approximately in the middle of its axial length (in the case of several clamping holes distributed over the axial length) there is a clamping hole 10''' vertically on the flattening 43. In principle, it is not absolutely necessary to align the clamping hole 10''' perpendicular to the surface 43 but in most cases—and therefore also in this case—it will be advantageous. Since the clamping hole 10''' extends advisedly eccentrically, i.e. not through the central hole 8, it may be favorable to provide symmetrically to the central axis another such clamping hole 10''' (or even several, distributed in axial direction).

For the attachment of such prism elements on the clamping surface 1, only one but preferably two attachment holes 9''' are required, which are arranged eccentric for instance in axial direction. An eccentric arrangement will result in particular if three or four attachment openings are arranged on an end region of the outer surface and the others opposite thereof, the clamping holes being for instance arranged inbetween. It may be pointed out that the flattening 43 is not absolutely necessary and that a clamping element 4 or 104 can also be equipped for use according to FIGS. 15 and 16 if only at least one attachment opening 9''' and advisedly also one clamping hole 10''' are provided, in which case, instead of the flattening 43, a plate replacing it can be attached on the clamping element preferably with attachment openings for the clamping surface in order to form a resting surface on the clamping surface In this latter case, the attachment openings 9''' need also not necessarily lie in the division spacing, since they merely serve to attach said plate on the clamping element 4 or 104, while this plate can be attached to the clamping surface 1 either by at least one attachment opening in it or by two attachment openings (possibly also more) located in the division spacing, and alternatively also simply by a shackle attached to the clamping surface and extending crosswise over the plate.

As soon as the workpiece W7 has been mounted on the clamping elements 304 it need only be clamped fast thereon. This is done by means of a clamping screw 5 which is screwed into the clamping hole 10''' and on which a clamping iron 321 is fastened which holds the workpiece W7 fast. The clamping iron 321 can, if desired, also be attached via another clamping screw at its other end, said clamping screw then having to be screwed into a clamping hole 10''' (not shown) of the clamping element 304b.

In accordance with FIG. 16, the flattening 43 extends parallel to a line which extends through the centers of the attachment holes 9, one clamping hole being eliminated by the secant of the surface 43. In principle, this also corresponds to the preferred embodiment but it has already been pointed out above that there is hardly any change in the function if an attachment opening is replaced by a clamping hole, i.e. the flattening 43 could just as well extend parallel to a line extending through the centers of two clamping holes, in which case one attachment opening 9 would be eliminated.

Figure 17:
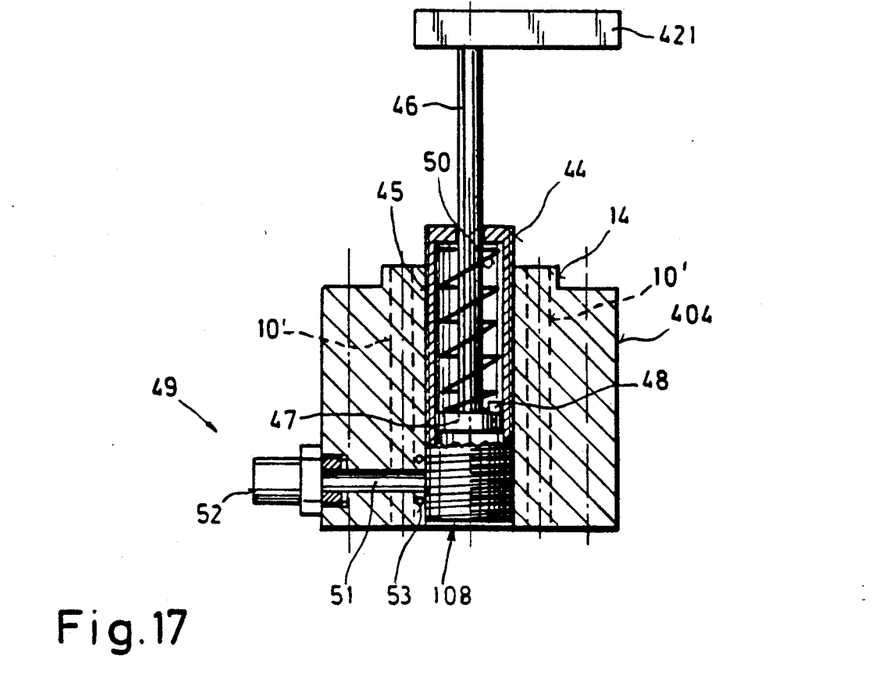
FIG. 17 shows another embodiment of a clamping element of the invention.

FIG. 17 illustrates another embodiment of the invention in which a clamping element 404 can, in principle, be developed in the same manner, as was previously described with reference to the elements 4, 104 or 304. Therefore, in FIG. 17, the already described holes and openings are merely indicated by dash-dot lines. Deviating from the above described forms, the clamping element 404, however, has a central hole 108 of large diameter in which, for instance, an internal thread has been cut so as to receive a cylinder 44 and secure it. The internal thread 45, as shown, extends over the entire length of the hole, and the cylinder 44 has an external thread which extends over its entire length, but neither this fact nor the provision of a thread are in general essential, since a bayonet connection could also be used or the cylinder 44 could have a smaller diameter than the hole 108 and be screwed in by means of a threaded ring fastened to it.

The cylinder 44 with a piston rod 46 and a holding member 421 which acts in the manner of a shackle are known and available on the market. This is also true of cylinders 44 of the type in which the piston rod 46 performs a turn of 90° upon its axial movement, for instance in the manner that a cam follower 48 is connected to the piston 47 (or the piston rod), which cam follower engages into a screw groove (not shown) of great steepness. In this way the shackle-like holding member can be raised 90° by swinging it away and be lowered by swinging into the alignment shown onto a workpiece.

In order to actuate the cylinder 44, at least one fluid connection 49 is required in order to lift the piston 47 against the pressure of a compression spring 50. This fluid connection 49 in any case comprises a fluid channel 51 passing, in particular radially, through the clamping element 404 to which there is attached towards the outside a connection nipple 52 which can advisedly be screwed on so as to be able to attach a hose or feed pipe. After the complete screwing of the cylinder 44 into the hole 108, the channel 51 is at the same height as a feed channel (not shown) of the cylinder 44 so that the (pneumatic or hydraulic) fluid entering through the channel 44 passes into the cylinder 44 in order to lift the piston 47. It may be advantageous to arrange a packing 53 (O-ring or the like) in the region of the inner mouth of the channel 51.

In FIG. 17, the clamping holes 10' of the inner circle, which extend up to the end surface of the elevation 14, are indicated in dashed line. However, whether space is still available for such clamping holes 10' depends on the diameter of the cylinder used. It would be conceivable to dispense entirely in such a case with the clamping holes 10' so as to be able to make the central hole 108 correspondingly larger if it is desired to use cylinders of larger diameter. It would however also be conceivable to provide a central hole 108 having the diameter of the elevation 14, in order optionally to screw in an insert which consists of a correspondingly thick cylinder 44 or one which forms an elevation 14 with clamping holes 10'. The latter possibility is in principle present, i.e. the clamping element 4, 104 or 304, and 404 respectively can be developed in two parts (or even multipartite), for instance in the manner that the elevation 14 is developed as core of the clamping element which can be screwed in. To be sure, a single piece development is preferred.

Figure 18:
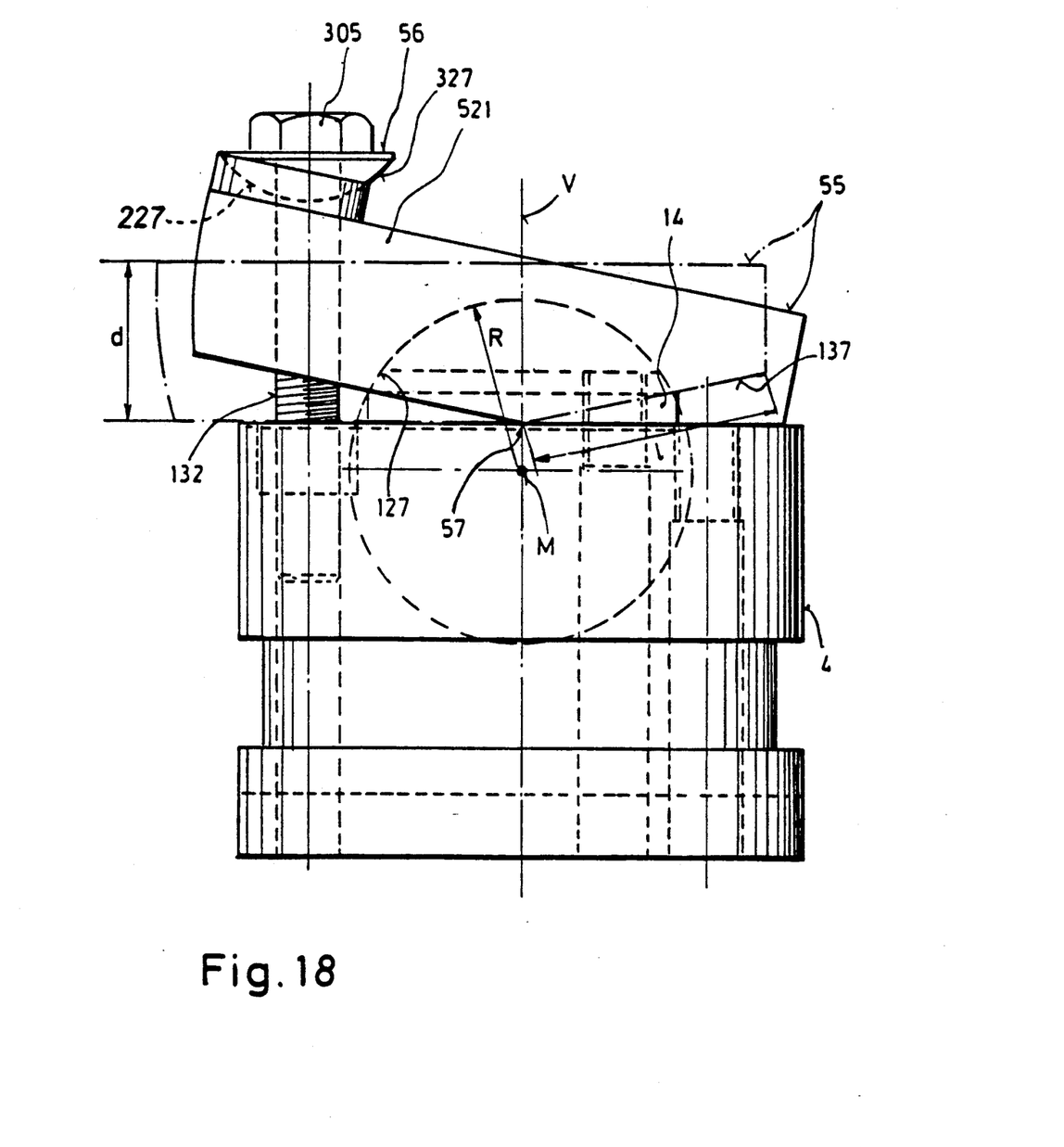
FIG. 18 is a variant of a shackle of the invention.

According to FIG. 18, a shackle 521 according to the invention has alternatively or in addition to the concavely curved step surface 127 of the radius R serving as resting surface on the elevation 14 (see FIG. 7) also a cup-shaped resting surface 227 located at the upper limiting surface 55 facing away from the clamping element 4, namely in the region of attachment opening 132 for the clamping screw 305, which is developed concave in the preferred embodiment shown.

Said resting surface 227 serves to support a corresponding mating resting surface 327 preferably of the same radius of curvature on the screw 305, in which connection the surface 327 can be developed directly on the bottom of the head of the screw 305. It is however preferred if the surface 327 is developed on a washer 56 which can be placed on the screw 305, since this permits the use of standard screws.

As can be noted from FIG. 18 and the two positions of the shackle 521 shown therein, the advantage of such a development resides in the fact that the screw head or the washer 56 is applied with its full bottom surface, even in the event of a relatively strongly inclined position of the shackle 521 with respect to a horizontal plane or of the clamping element 4 and this regardless of the angle of inclination to the clamping element 4. Furthermore, dirtying by chips is practically impossible.

It is advantageous in this connection if the oblique end surface is longer (as compared with the surface 37 of FIG. 7) on the (right) end facing away from the workpiece (to be clamped on the left in FIG. 18). The length 1 is advisedly so dimensioned that the bevel edge 57 defining the start of said oblique surface 137 lies in a common vertical plane V having the center point M of curvature of the circle defining the surface 127. It is also advisable for the length 1 to be greater than the thickness d of the shackle 521.

It can be noted from the above explanations that the clamping element 4, 104, 204, 304, 404 in question advisedly, but not necessarily, has the recess 19 on its resting surface with which it comes to rest against the clamping surface 1, which recess can incidentally be rounded in the same manner as described with reference to the shackle 121 (FIG. 7) and the step surface 127. The clamping surface which is opposite the resting surface need not have an elevation 14 which may possibly have the same step surface 127 as the shackle 121. It furthermore results from FIGS. 7 and 8 that the step surface 127 is curved in two respects namely in the one plane with the radius R and in the other plane with the radius r, so that in the final analysis it corresponds to a cup-shaped surface if the radii R and r are equally large. Such an embodiment is preferred.

I claim:

1. A clamping element for clamping a workpiece onto a clamping plate having receiving recesses distributed over its surface in accordance with a predetermined division spacing, said clamping element comprising a clamping body defining a longitudinal axis and having a resting surface defining a place to engage said clamping surface, and at least one clamping surface being opposite said resting surface and having a plurality of attachment openings spaced apart from each other by the division spacing for inserting attachment bolts for the attachment on said clamping surface and a plurality of clamping holes for attaching clamping means for clamping said workpiece, said openings and said holes extending perpendicularly to the plane of said resting surface and being arranged along at least one circle around said longitudinal axis, wherein said clamping surface has an inner raised surface portion and an outer lowered surface portion around said longitudinal axis.

2. Clamping element as claimed in claim 1, wherein said attachment openings are spaced apart from each other at uniform angular distances.

3. Clamping element as claimed in claim 1, wherein said clamping holes are spaced apart from each other at uniform angular distances.

4. Clamping element as claimed in claim 1, wherein a number of said attachment openings and said clamping holes are arranged on a common circle.

5. Clamping element as claimed in claim 4, wherein said attachment openings and said clamping holes are spaced apart from each other by the same distance.

6. Clamping element as claimed in claim 4, wherein said attachment openings and said clamping holes are alternately arranged.

7. A clamping element for clamping a workpiece onto a clamping plate having receiving recesses distributed over its surface in accordance with a predetermined division spacing, said clamping element comprising a clamping body defining a longitudinal axis and having a resting surface defining a plane to engage said clamping surface, and at least one clamping surface being opposite said resting surface and having a plurality of attachment openings spaced apart from each other by the division spacing for inserting attachment bolts for the attachment on said clamping surface and a plurality of clamping holes for attaching clamping means for clamping said workpiece, said openings and said holes extending perpendicularly to the plane of said resting surface and being arranged along at least one circle around said longitudinal axis, wherein the number of said attachment openings in one circle is six.

8. Clamping element as claimed in claim 1, wherein the number of said clamping holes in one circle is six.

9. Clamping element as claimed in claim 1, wherein said attachment openings are substantially cylindrical holes.

10. Clamping element as claimed in claim 9, wherein said attachment openings comprise a counter sinking for completely receiving the head of an attachment screw to be inserted.

11. Clamping element as claimed in claim 1, further comprising
a positioning hole situated on said longitudinal axis.

12. Clamping element as claimed in claim 11, wherein said positioning hole comprises fastening means for positioning and holding a fluidic lifting cylinder, the element further comprising channel means for supplying fluid to the lifting cylinder.

13. A clamping element for clamping a workpiece onto a clamping plate, said clamping plate having receiving recesses distributed over its surface in accordance with a predetermined division spacing, said clamping element comprising a clamping body defining a longitudinal axis and having
a resting surface defining a plane to engage said surface of said clamping plate;
at least one clamping surface located opposite said resting surface;
a plurality of attachment openings spaced apart from each other by the division spacing for inserting attachment bolts for an attachment of said clamping element on said clamping plate surface;
a plurality of clamping holes for attaching clamping means for clamping said workpiece;
wherein said openings and said holes extend perpendicularly to the plane of said resting surface and are arranged along at least one circle around said longitudinal axis;
there is a second circle of clamping holes concentric with said one circle, said second circle being disposed relative to said one circle along said longitudinal axis.

14. Clamping element as claimed in claim 13, wherein said attachment openings have an inner thread.

15. Clamping element as claimed in claim 1, wherein said clamping holes have an inner thread.

16. Clamping element as claimed in claim 13, wherein said division space corresponds to a standard spacing.

17. Clamping element as claimed in claim 1, further comprising
a marking field for marking at least one of said openings and holes.

18. A clamping element for clamping a workpiece onto a clamping plate having receiving recesses distributed over its surface in accordance with a predetermined division spacing, said clamping element comprising a clamping body defining a longitudinal axis and having
a resting surface defining a plane to engage said clamping surface, and
at least one clamping surface being opposite said resting surface and having
a plurality of attachment openings spaced apart from each other by the division spacing for inserting attachment bolts for the attachment on said clamping surface and
a plurality of clamping holes for attaching clamping means for clamping said workpiece,
said openings and said holes extending perpendicularly to the plane of said resting surface and being arranged along two coaxial circles of different diameter around said longitudinal axis.

19. Clamping element as claimed in claim 18, wherein the circle of larger diameter comprises only clamping holes.

20. Clamping element as claimed in claim 18, wherein a distribution of said openings and holes is at equal angular spaces in both circles.

21. Clamping element as claimed in claim 20, wherein the holes and openings in both circles are on common radii.

22. Clamping element as claimed in claim 1, wherein said resting surface of said clamping body comprises a circular recess being coaxial to said longitudinal axis.

23. Clamping element as claimed in claim 1, wherein said clamping surface has an inner raised surface portion and an outer lowered surface portion around said longitudinal axis, whereas said resting surface of said clamping body comprises a circular recess being coaxial to said longitudinal axis, said raised surface portion fitting into said circular recess.

24. Clamping element as claimed in claim 22, wherein said circular recess has a tapering circumferential surface.

25. Clamping element as claimed in claim 24, wherein said tapering surface is rounded so as to have a rounding center situated with respect to each one of generatrices of said circumferential surface beyond said longitudinal axis.

26. Clamping element as claimed in claim 1, wherein said raised surface portion is substantially circular in plane view and has a tapering circumferential surface.

27. Clamping surface as claimed in claim 26, wherein said tapering surface is rounded so as to have a rounding center situated with respect to each one of generatrices of said circumferential surface beyond said longitudinal axis.

28. Clamping element as claimed in claim 18, wherein said clamping surface has an inner raised surface portion and an outer lowered surface portion around said longitudinal axis, circle of smaller diameter being arranged on said inner raised surface portion.

29. Clamping element as claimed in claim 18, wherein said clamping surface has an inner raised surface portion and an outer lowered surface portion around said longitudinal axis, circle of larger diameter being arranged on said outer lowered surface portion.

30. Clamping element as claimed in claim 18, wherein said clamping surface has an inner raised surface portion and an outer lowered surface portion around said longitudinal axis, circle of smaller diameter being arranged on said inner raised surface portion, circle of larger diameter being arranged on said outer lowered surface portion, and the ratio of the diameters of said circles of different diameters is 1:2.

31. Clamping element as claimed in claim 1, wherein said clamping body is symmetrical with respect to said longitudinal axis.

32. Clamping element as claimed in claim 31, wherein said clamping body is cylindrical at least over part of its circumference.

33. Clamping element as claimed in claim 1, wherein said clamping body comprises a recess extending in a central region seen in the direction of its longitudinal axis.

34. Clamping element as claimed in claim 33, wherein said recess is circular.

35. Clamping element as claimed in claim 34, wherein said recess extends over more than 180°.

36. Clamping element as claimed in claim 34, wherein said recess extends in axial direction of said longitudinal axis over a fraction of said division spacing, a tolerance space being added.

37. Clamping element as claimed in claim 34, wherein said recess extends in axial direction of said longitudinal axis over a quarter the distance of said division spacing, a tolerance space being added.

38. Clamping element as claimed in claim 1, wherein said clamping body comprises at least one second attachment opening extending normally to a plane running through said longitudinal axis, and being arranged between said clamping surface and said resting surface.

39. Clamping element as claimed in claim 38, wherein said clamping body comprises at least two of said second attachment openings spaced apart by said division spacing.

40. Clamping element as claimed in claim 38, wherein said at least one second attachment opening is elongated and defines an attachment axis, and said clamping body comprises a flat supporting surface extending normally to said attachment axis.

41. Clamping element as claimed in claim 38, wherein said clamping body comprises at least one second clamping hole extending parallel to said second attachment opening.

42. Clamping element as claimed in claim 1, wherein said clamping surface is flat at least in part.

43. Clamping element as claimed in claim 1, wherein said clamping body is integrally formed as one piece.

* * * * *